United States Patent
Iwakiri et al.

(10) Patent No.: US 8,259,577 B2
(45) Date of Patent: Sep. 4, 2012

(54) PACKET FORWARDING DEVICE

(75) Inventors: Masahiko Iwakiri, Fukuoka (JP); Shinichi Shiwachi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 40 days.

(21) Appl. No.: 12/048,553

(22) Filed: Mar. 14, 2008

(65) Prior Publication Data

US 2009/0067332 A1    Mar. 12, 2009

(30) Foreign Application Priority Data

Mar. 16, 2007    (JP) ................. 2007-068523

(51) Int. Cl.
*H04L 1/00* (2006.01)
(52) U.S. Cl. .................................. 370/235
(58) Field of Classification Search .......... 370/229, 370/230, 230.1, 231, 232, 233, 234, 235, 370/395.21, 395.52, 412, 415
See application file for complete search history.

(56) References Cited

U.S. PATENT DOCUMENTS

| | | | | |
|---|---|---|---|---|
| 5,020,020 A | * | 5/1991 | Pomfret et al. | 709/235 |
| 5,848,056 A | * | 12/1998 | Meurisse et al. | 370/232 |
| 6,002,667 A | * | 12/1999 | Manning et al. | 370/232 |
| 6,700,867 B2 | * | 3/2004 | Classon et al. | 370/216 |
| 7,085,540 B2 | * | 8/2006 | Cao et al. | 455/68 |
| 7,720,063 B2 | * | 5/2010 | Maiorana et al. | 370/389 |
| 7,760,636 B1 | * | 7/2010 | Cheriton | 370/235 |
| 2004/0022248 A1 | * | 2/2004 | Yuang et al. | 370/395.7 |
| 2004/0066746 A1 | * | 4/2004 | Matsunaga | 370/235 |
| 2004/0156315 A1 | * | 8/2004 | Walls et al. | 370/235 |
| 2005/0152397 A1 | * | 7/2005 | Bai et al. | 370/468 |
| 2005/0254508 A1 | * | 11/2005 | Aksu et al. | 370/428 |
| 2006/0203760 A1 | * | 9/2006 | Fukui et al. | 370/328 |
| 2006/0209687 A1 | * | 9/2006 | Yagawa et al. | 370/229 |
| 2007/0025250 A1 | * | 2/2007 | Shimonishi et al. | 370/231 |
| 2008/0144509 A1 | * | 6/2008 | Chan et al. | 370/235 |

FOREIGN PATENT DOCUMENTS

| | | |
|---|---|---|
| JP | 2002-237841 | 8/2002 |
| JP | 2005-151202 | 6/2005 |
| JP | 2006-197110 | 7/2006 |

* cited by examiner

*Primary Examiner* — Andrew Lai
*Assistant Examiner* — Juvena Loo
(74) *Attorney, Agent, or Firm* — Staas & Halsey LLP

(57) ABSTRACT

A packet forwarding device reads each packet from a common buffer at a predetermined band velocity and transfers the readout packet; detects passage of a re-transmission request packet requesting re-transmission of a packet having been transmitted, from a receiving terminal to a packet transmission source; and limits a writing band of writing a packet transmitted from the packet transmission source terminal, which is a receiving terminal to which the re-transmission request packet is destined, into the common buffer when the re-transmission request packet is detected.

8 Claims, 6 Drawing Sheets

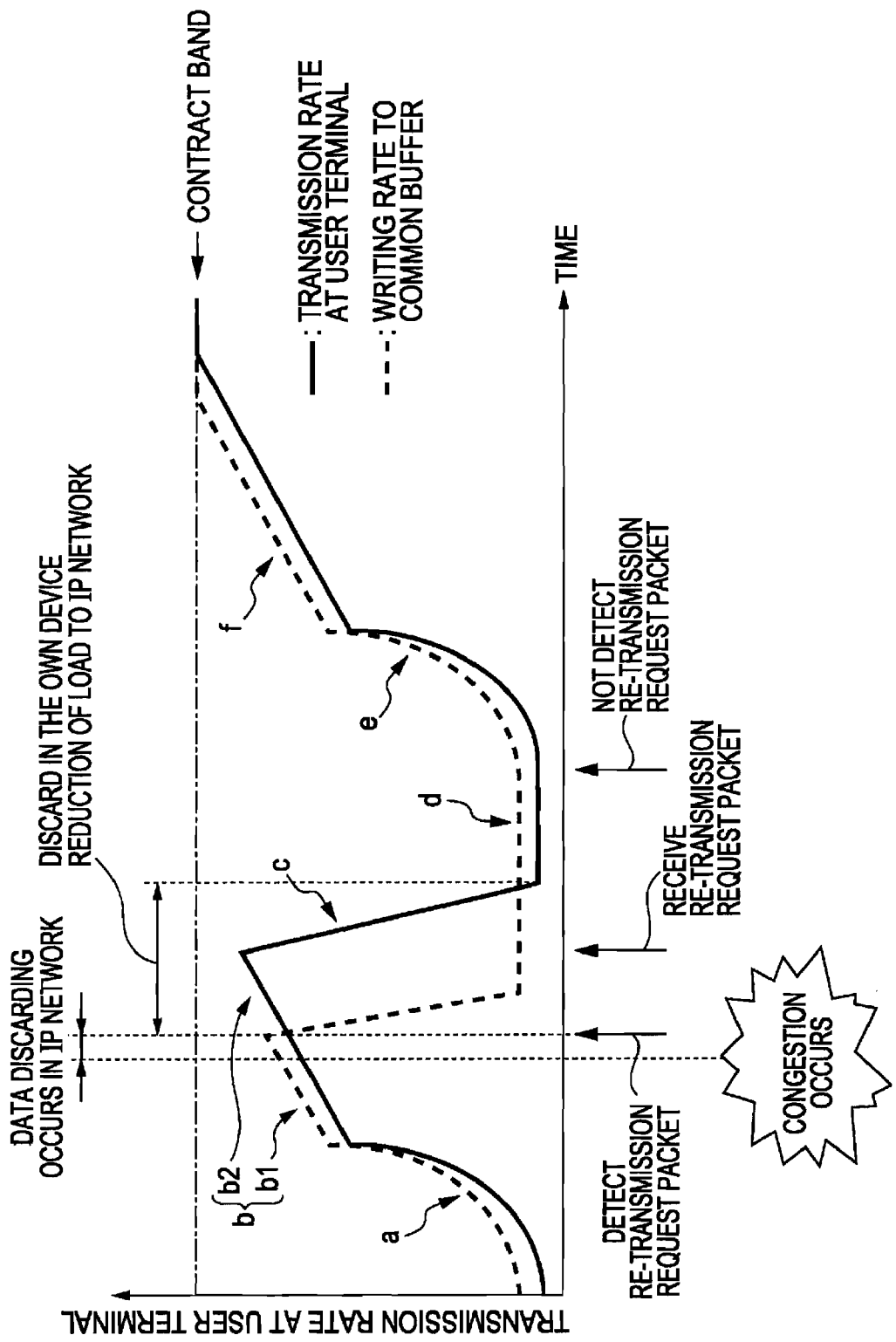

PACKET FORWARDING DEVICE

CROSS-REFERENCE TO RELATED APPLICATIONS

This application is related to and claims priority to Japanese patent application no. 2007-068523 filed on Mar. 16, 2007 in the Japan Patent Office, and incorporated by reference herein.

BACKGROUND

1. Field

The present invention relates to a packet forwarding method, device, and computer readable medium thereof, which temporarily stores packets transmitted from a plurality of transmission source terminals into a common buffer, reads out the packets from the common buffer at a given band velocity, and transfers the readout packets to other terminals.

2. Description of the Related Art

The packet forwarding devices as just mentioned are located in a network in which packet data flows. FIG. 1 is an internal block diagram showing a conventional packet forwarding device. The packet forwarding device 10 is constituted by a multiplex/separator 11, a common buffer 12, an input packet counter 13, a band control unit 14, a write control unit 15, and a read control unit 16.

A number of packets, which have been transmitted from user terminals 20-1 to 20-N, are multiplexed by the multiplex/separator 11 configuring the packet forwarding device 10. Then, the multiplexed packets are written into the common buffer 12. When the packets are written into the common buffer 12, the number of input packets is counted for each of the user terminals 20-1 to 20-N by the input packet counter 13. Then, the band control unit 14 receives its count value and controls the write band so as to inhibit the writing operation at a rate in excess of a contract rate contracted for each user in order to keep fairness of the service for the users. Subsequently, the write control unit 15 controls the writing operation of the packet into the common buffer 12 within the controlled band.

The packet having been transmitted at a rate in excess of a predetermined writing rate is discarded without being written into the common buffer 12. The read control unit 16 controls the operation of reading a packet at a predetermined band velocity from the common buffer 12. The packet read out from the common buffer 12 is transmitted to the IP network.

FIG. 2 is a model diagram showing a congestion occurring in one of the routers in the IP network. Usually, a number of routers (six routers 30-1 to 30-6 in this example) are located in an IP network 30. When a congestion occurs in one (the router 30-3 in this example) of the routers in the IP network 30, a packet transmitted from the packet forwarding device 10 to the IP network 30 is discarded by the IP network router 30-3 suffering from the congestion. As a result, the packet does not reach an opposite device (server 40 in the example shown in FIG. 2), which should receive the packet if no congestion occurs. Then, the opposite device (server 40) detects that the packet has been discarded in the middle of the line by the TCP protocol, and transmits a re-transmission request packet to the user terminal of the transmission source. The re-transmission request packet passes through the packet forwarding device 10 as shown in FIG. 1, and is transmitted to the user terminal of the transmission source. Upon receipt of the re-transmission request packet, the user terminal of the transmission source greatly decreases the data transmission rate in order to settle the congestion down. When the congestion settles down and no packet is discarded, the opposite device (server 40) stops the transmission of the re-transmission request packet. The user terminal of the transmission source knows the removal of the congestion when it receives no re-transmission request packet, and resumes the transmission of the packet. When the packet transmission is resumed, the data transmission rate is gradually returned to the original one according to a slow start algorithm.

FIG. 3 shows a graph showing a variation of the data transmission rate at the user terminal with time. At the start of transmission, the transmission rate acceleratedly increases according to the slow start algorithm as shown in a segment "a". When reaching a certain level of the data transmission rate, the data transmission rate linearly increases as shown in a segment "b". Assume that a congestion occurs in a certain router in the middle of the segment "b". At this time, the user terminal does not yet sense the occurrence of the congestion. Accordingly, the user terminal continues the linear increase of the data transmission rate. After a short while, the user terminal receives the re-transmission request packet and knows the congestion occurrence. Then, the user terminal sharply decreases the transmission rate as shown in a segment "c". The transmission rate is kept low in a segment "d" where the congestion continues. Thereafter the user terminal receives no re-transmission request packet and knows that the congestion has settled down. At this time, as in a segment "e", the user terminal acceleratedly increases the transmission rate again according to the slow start algorithm, and linearly increases the transmission rate as in a segment "f".

As shown in FIG. 3, a time lag is present between a time point where the congestion occurs and a time point where the user terminal of the packet transmission source receives the re-transmission request packet. During a period that the user terminal does not yet sense (detect) the congestion occurrence, the transmission rate continuously increases. The continuous increase of the transmission rate forms one of factors to delay the settling down of the congestion.

JP-A-2002-237841 describes its object as "to easily and equally re-allocate an excess band while guaranteeing a packet transfer rate equal to or more than a minimum guarantee rate at the time of increase in traffic, in a packet communication network for which an agreement is made on the minimum guarantee rate and a maximum limiting rate for each service". In the patent document, however, there is no description about the technology for swiftly settling down the congestion once occurred.

SUMMARY

According to an aspect of an embodiment, there is provided a packet forwarding device reading each packet from a common buffer at a predetermined band velocity and transferring the readout packet; detecting passage of a re-transmission request packet requesting re-transmission of a packet having been transmitted from a receiving terminal to a packet transmission source; and limiting a writing band of writing a packet transmitted from the transmission source terminal, which is a receiving terminal to which the re-transmission request packet is destined, into the common buffer when the re-transmission request packet is detected.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a graph showing variations of a packet transmission rate at the user terminal and a packet writing rate to a common buffer when the packet forwarding device shown in FIG. 4 is employed.

DETAILED DESCRIPTION OF THE PREFERRED EMBODIMENTS

Figure 4:
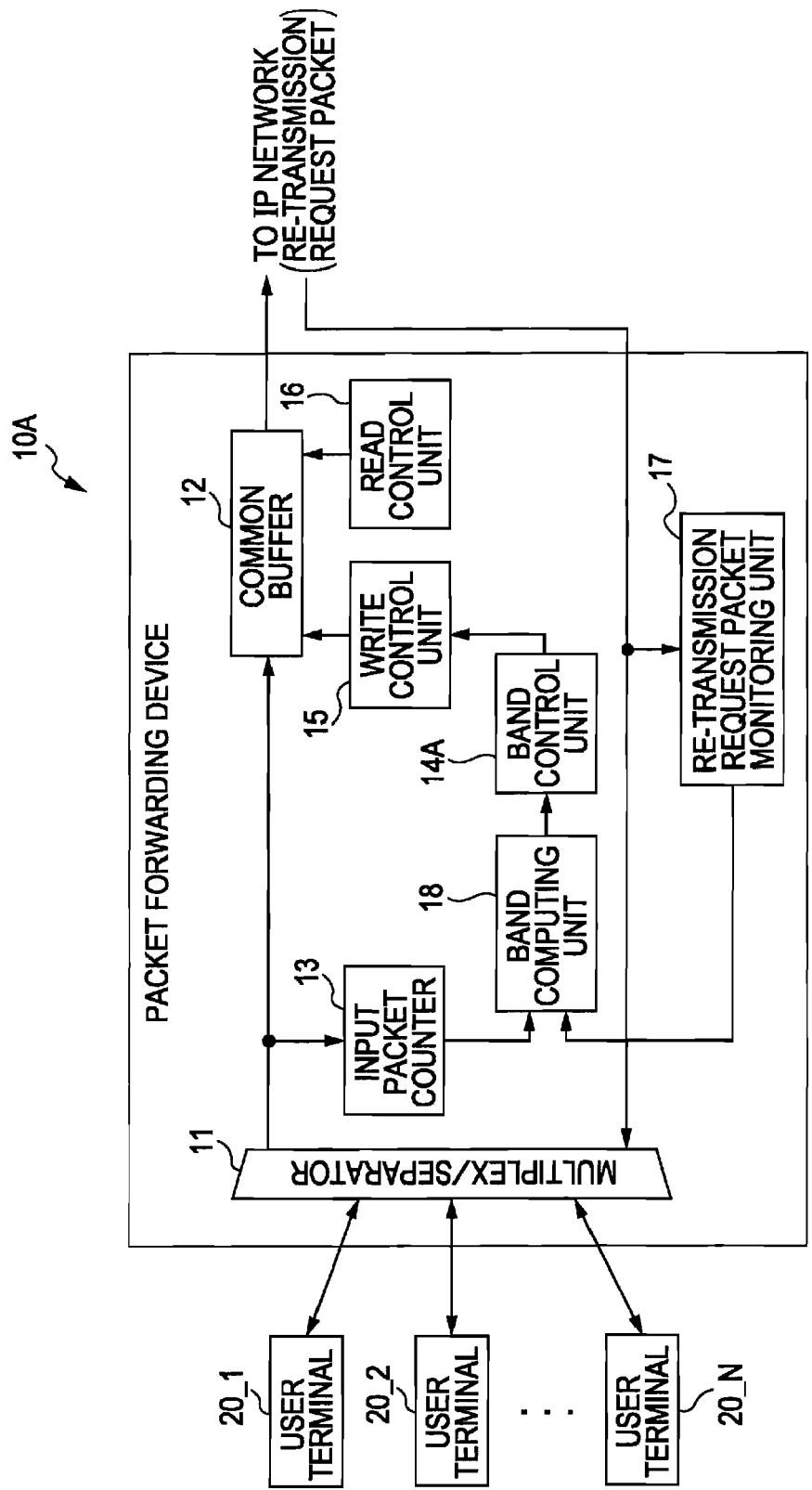
FIG. 4 is an internal block diagram showing a packet forwarding device which is an embodiment of the present invention.

One example embodiment of the present invention will be described with reference to the accompanying drawings. FIG. 4 is an internal block diagram showing a packet forwarding device which is an embodiment of the present invention. In FIG. 4, like reference symbols are used for designating like or equivalent components in the conventional packet forwarding device shown in FIG. 1.

Figure 2:
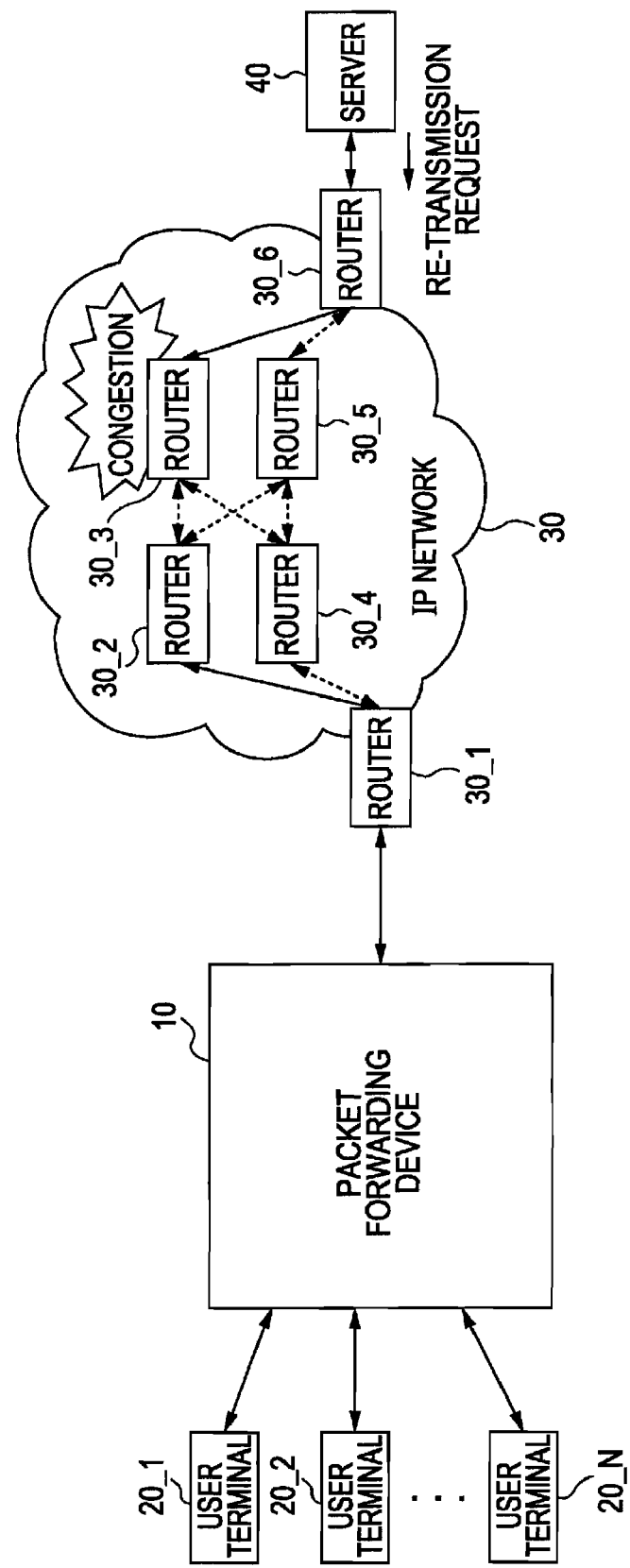
FIG. 2 is a model diagram showing a congestion occurring in one of router the routers in an IP network.
Figure 3:
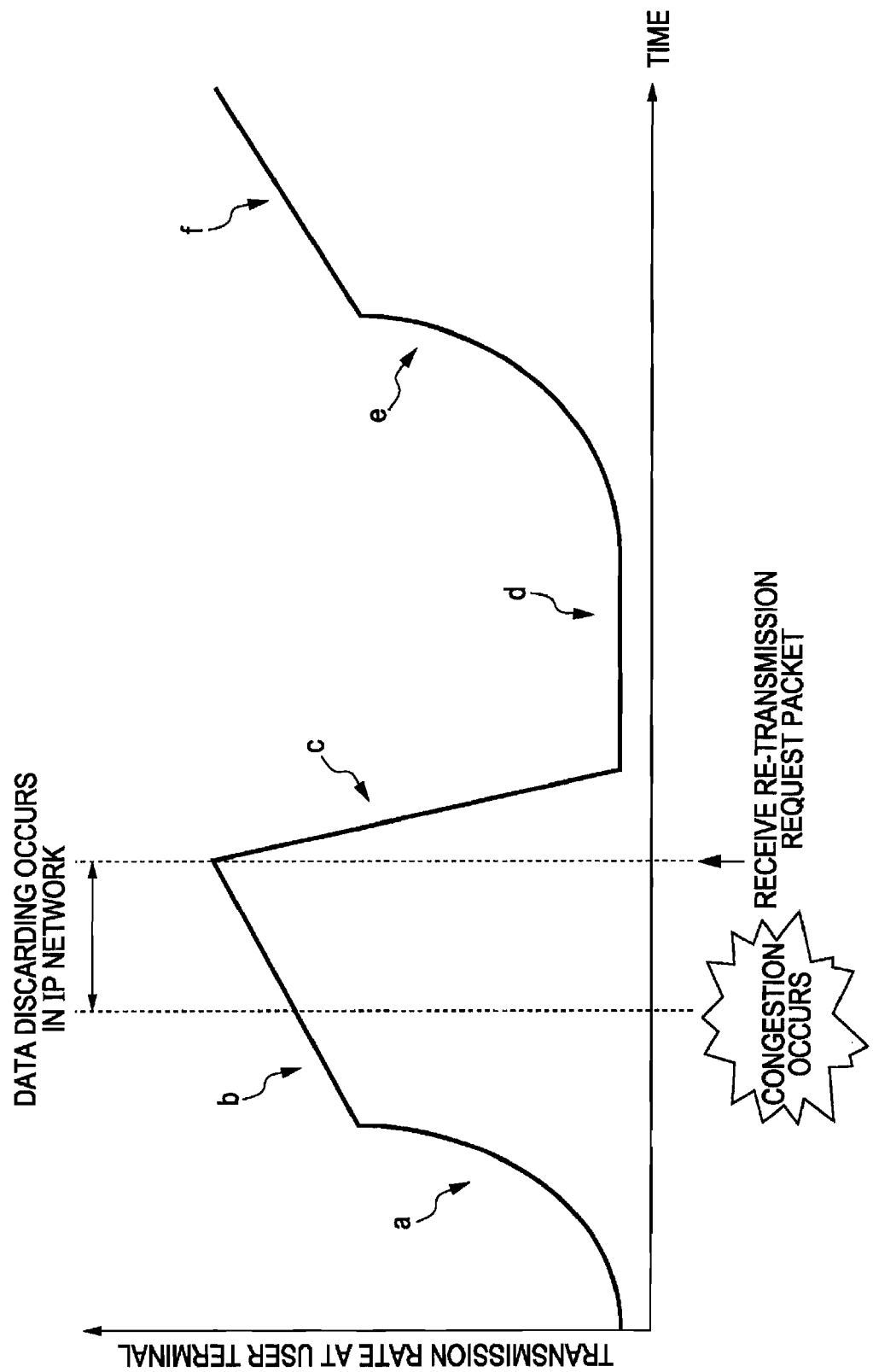
FIG. 3 is a graph showing a variation of a data transmission rate at a user terminal with time.
Figure 5:
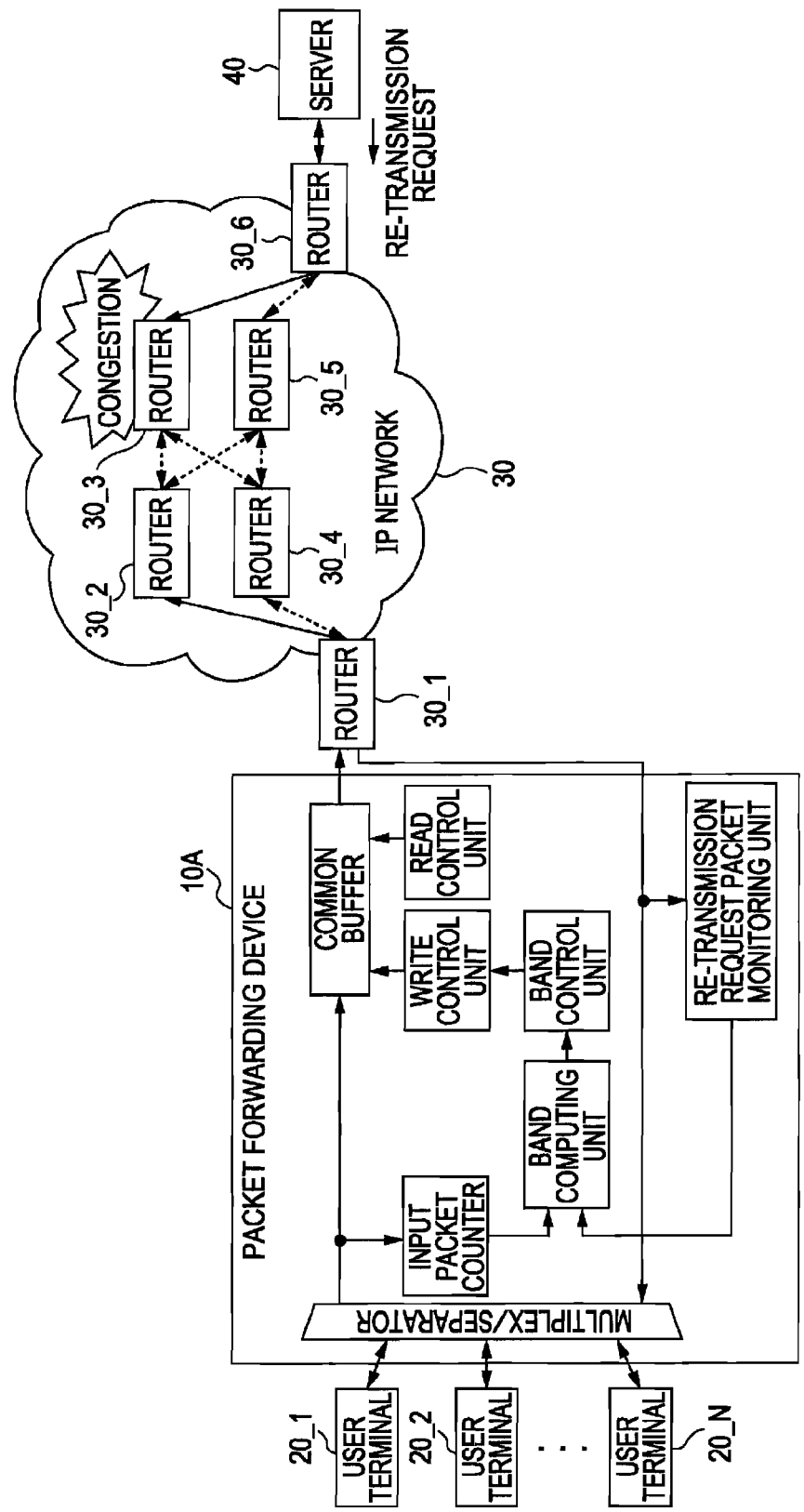
FIG. 5 is a model diagram showing a congestion occurring in one of routers in the IP network when the packet forwarding device shown in FIG. 4 is employed.

FIG. 5 is a model diagram showing a congestion occurring in one of the routers in an IP network when the packet forwarding device shown in FIG. 4 is employed. Also in FIG. 5, like reference symbols are used for designating like or equivalent components in FIG. 2.

Figure 1:
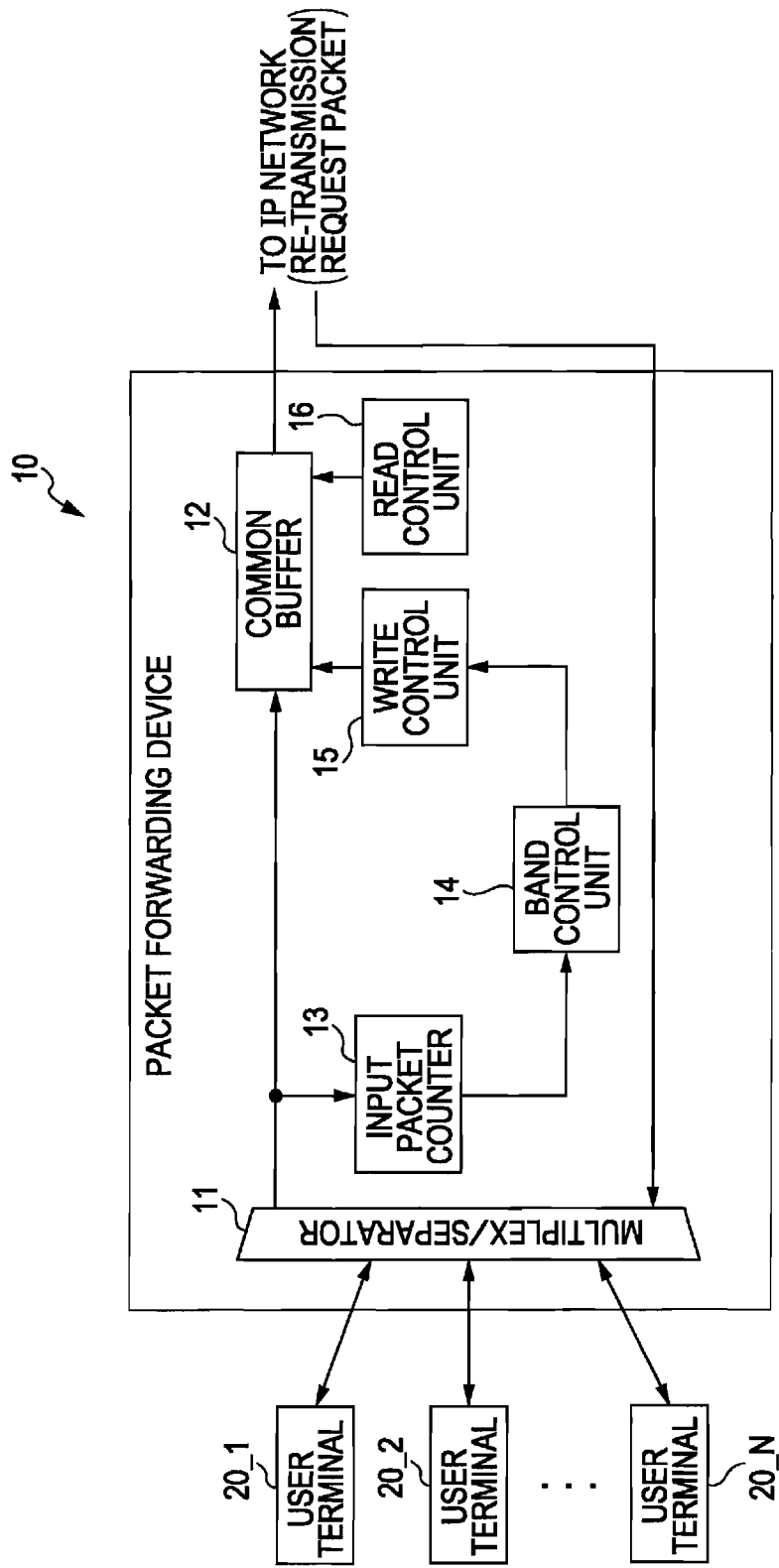
FIG. 1 is an internal block diagram showing a conventional packet forwarding device.

A packet forwarding device 10A shown in FIG. 4 includes a re-transmission request packet monitoring unit 17 and a band computing unit 18, in addition to the components contained in the packet forwarding device 10 shown in FIG. 1.

The re-transmission request packet monitoring unit 17 monitors, for each user terminal, a passage of the re-transmission request packet which passes from an opposite device (server 40 in an example of FIG. 5) to the user terminals. Then, the re-transmission request packet monitoring unit 17 informs the band computing unit 18 of the passage of the re-transmission request packet.

The band computing unit 18 computes a band level of a write band, which is used for writing a packet transmitted from each user terminal into the common buffer 12. The band computing unit 18 utilizes for its computation a count value representing a packet arrival rate of the packet for each user terminal, which is output from the input packet counter 13, and the passage of the re-transmission request packet destined from the re-transmission request packet monitoring unit 17 to each user terminal.

One of the features of the computation is that upon receipt of the passage of the re-transmission request packet from the re-transmission request packet monitoring unit 17, the band computing unit 18 computes for greatly lowering the write band of the packet having been transmitted from the user terminal to which the re-transmission request packet is destined. According to an aspect of an embodiment, the write band is lowered prior to the user terminal decreasing its transmission rate. Another feature of the computation is to increase the writing rate of the packet having been transmitted from the user terminal into the common buffer 12 so as to trace an increasing curve of the transmission rate after the congestion has settled down and no passage of the re-transmission request packet is present and prior to increase of the transmission rate of the packet transmitted from the user terminal.

The band control unit 14 shown in FIG. 1 utilizes a count value representing a packet arrival rate of the packet for each of the user terminals 20-1 to 20-N, which is output from the input packet counter 13. The band control unit 14 performs the control so that the write band used for writing the packet into the common buffer 12 does not exceed the contract bands of the user terminals. A band control unit 14A shown in FIG. 4 controls the write band to the common buffer 12 so as not exceed the contract bands of the user terminals by utilizing the computation result from the band computing unit 18. Further, when the band computing unit 18 outputs such a computation result as to lower the write band upon receipt of the passage of the re-transmission request packet, the band control unit 14A lowers the write band on the basis of the computation result. When after the congestion settles down, the user terminal transmits a packet while increasing the transmission rate of the packet from the user terminal according to the slow start algorithm, the band control unit 14A performs the control for increasing the writing rate to the common buffer 12 according to the computation result by the band computing unit 18. In this case, it is preferable to increase the writing rate so as to trace the ascending curve of the transmission rate just before the transmission rate of the packet increases.

FIG. 6 is a graph showing variations of a packet transmission rate at the user terminal when the packet forwarding device shown in FIG. 4 is employed. FIG. 6 also shows variations of a packet writing rate into the common buffer in the packet forwarding device shown in FIG. 4. In FIG. 6, the packet is the one that is transmitted from one user terminal.

At the start of transmission, the user terminal acceleratedly increases the transmission rate according to the slow start algorithm as shown in a segment "a". At this time, in the packet forwarding device 10A shown in FIG. 4, the writing rate (broken line in FIG. 6) to the common buffer 12 is increased just before the transmission rate of the packet from the user terminal increases and so as to trace the ascending curve of the transmission rate. To this end, the band computing unit 18 shown in FIG. 4 is outputting a writing rate to the band control unit 14A and receives a count value of a transmission rate corresponding to the writing rate from the input packet counter 13. Subsequently, the band computing unit 18 doubles the writing rate. The process to double the writing rate is repeated till the writing rate reaches the upper limit in the line contract.

The increase of the transmission rate of the packet from the user terminal and the increase of the writing rate to the common buffer 12 continue also in a segment "b", and let us assume that a congestion occurs in the middle of the segment "b". If the congestion occurs, the packet forwarding device 10A detects the passage of the re-transmission request packet after some delay from the congestion occurrence. The packet forwarding device also does not know the occurrence of the congestion during a period from the congestion occurrence to the detection of the passage of the re-transmission request packet in the packet forwarding device. Accordingly, the packet forwarding device continues the transmission of the packet and the discarding of the data occurs in the IP network 30. However, at a time point where the packet forwarding device detects the passage of the re-transmission request packet, the writing rate to the common buffer 12 is greatly decreased in the middle of the segment "b" (or the writing rate to the common buffer 12 is already decreased in segment "b1," which is the First half of the segment "b." As a result, the transmission rate of the packet to the IP network 30 is greatly decreased. Accordingly, after this time point, the congestion will settle down.

The re-transmission request packet reaches the user terminal after a time lag from the detection of the passage of the re-transmission request packet in the packet forwarding device 10A, and the transmission rate of the packet is lowered in the user terminal (segment "c"). It is noted that in the embodiment the lessening of the load to the IP network 30 already starts in a segment "b2" that is a second half of the segment "b" preceding to the segment "c". The decrease in the writing rate at "b1" quickens the setting down of the congestion. According to an aspect of an embodiment, as shown in FIG. 6, a time period in which data is discarded is reduced, because the packet forwarding device reduces a time from congestion occurrence to retransmission request detection.

When the re-transmission request packet does not reach the user terminal for a short while (segment "d"), the user terminal confirms that the congestion has settle down. The user terminal acceleratedly increases the transmission rate according to the slow start algorithm again (segment "e"). Thereafter, the user terminal linearly increases the transmission rate (segment "f"). Also at this time, in the packet forwarding device 10A, the writing rate to the common buffer is increased just before the transmission rate increases and so as to trace the ascending curve of the transmission rate.

Only the transmission rate and the writing rate have been described. An excess band produced as the result of detecting the congestion and lowering the writing rate, and an excess band during a period after the congestion settles down and during which the writing rate is increased so as to trace the ascending curve of the transmission rate without rapidly increasing the writing rate, are allocated to other user terminals. Accordingly, the increased band is available for other user terminals although it is temporarily available. This ensures a further increase of the network utilization efficiency.

The re-transmission request packet monitoring unit 17 in the packet forwarding device 10A shown in FIG. 4 also monitors a frequency of the passage of the re-transmission request packet to the user terminals. The monitoring enables the system to grasp the packet communication capability of each user terminal. When one user terminal has a high frequency of the passage of the re-transmission request packet, the system understands that the user terminal has no packet communication ability till the contract band is reached, and the band computing unit 18 performs the computation in a state that the contract band per se is lowered. Even if no congestion occurs, the system allows the writing rate to the common buffer 12 to increase up to a new contract band, which is lower than the original contract band. By so doing, the congestion can be prevented in advance. An excess band produced as the result of lowering the contract band is allocated to other user terminals, thereby improving the utilization efficiency of the common buffer 12 and the network. The contract band per se is lowered as just mentioned, so that the charge at each user terminal is also lowered, although its construction is not shown in FIG. 4 and the like.

The embodiments can be implemented in computing hardware (computing apparatus) and/or software, such as (in an unlimiting example) any computer that can store, retrieve, process and/or output data and/or communicate with other computers. The computer comprises a controller (CPU) and a display device. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Examples of transmission communication media include a carrier-wave signal, an optical signal, etc. Further, according to an aspect of the embodiments, any combinations of the described features, functions and/or operations including benefits thereof can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A packet forwarding device configured to communicate via a network, comprising:
   a writing unit to write packets transmitted from a plurality of transmission source terminals into a common buffer;
   a transfer unit to read each packet from the common buffer at a predetermined band velocity and transferring the readout packet to a terminal;
   a monitor to detect a re-transmission request packet of the terminal to a transmission source terminal; and
   a controller to start limitation of a write band of writing a packet transmitted over the network from the transmission source terminal into the common buffer of the packet forwarding device, when the monitor detects the re-transmission request packet at the packet forwarding device before the re-transmission request packet reaches the transmission source terminal over the network.

2. The packet forwarding device according to claim 1, wherein the controller allocates an excess band produced as a result of limiting the write band for the transmission source terminal to other transmission source terminals.

3. The packet forwarding device according to claim 1, wherein, when the monitor detects no re-transmission request packet destined to the transmission source terminal, for a predetermined period of time, the controller traces an ascending curve of a transmission rate by gradually lessening the write band limitation for the transmission source terminal before the transmission rate of a packet from the transmission source terminal increases.

4. The packet forwarding device according to claim 1, wherein the monitor detects the passage of the re-transmission request packet and a frequency of the passage of the re-transmission request packet for each transmission source terminal.

5. The packet forwarding device according to claim 4, wherein the controller lowers a contract band of the transmission source terminal when a frequency of the passage of the re-transmission request packet for the transmission source terminal exceeds a predetermined frequency.

6. The packet forwarding device according to claim 5, wherein the controller allocates to another transmission source terminal an excess band produced as a result of lowering the contract band of the transmission source terminal.

7. A packet forwarding device that communicates via a network with a transmission source terminal and a terminal, comprising:
- a common buffer; and
- a controller
    - to write packets transmitted from the transmission source terminal into the common buffer,
    - to read each packet from the common buffer at a predetermined band velocity and transferring the readout packet to the terminal,
    - to detect a re-transmission request packet of the terminal to the transmission source terminal, and
- to start limitation of a write band of writing a packet transmitted over the network from the transmission source terminal into the common buffer of the packet forwarding device, when the re-transmission request packet is detected at the packet forwarding device before the re-transmission request packet reaches the transmission source terminal over the network.

8. A packet forwarding method, comprising:
- writing packets transmitted from a plurality of transmission source terminals into a common buffer in a packet forwarding device configured to communicate over a network with the plurality of transmission source terminals;
- reading each packet from the common buffer at a predetermined band velocity and transferring the readout packet to a terminal;
- detecting a re-transmission request packet of the terminal to a transmission source terminal; and
- limiting a write band of writing a packet transmitted over the network from the transmission source terminal into the common buffer of the packet forwarding device, when detecting the re-transmission request packet before the re-transmission request packet reaches the transmission source terminal over the network.

* * * * *